United States Patent
Cheng et al.

(10) Patent No.: US 10,832,635 B2
(45) Date of Patent: Nov. 10, 2020

(54) DISPLAY APPARATUS HAVING DISPLAY PANEL AND HUMIDITY DETECTION METHOD THEREOF AND GAMMA CURVE CALIBRATION METHOD THEREOF

(71) Applicant: Himax Display, Inc., Tainan (TW)

(72) Inventors: Hsiu-Yin Cheng, Tainan (TW); Biing-Seng Wu, Tainan (TW); Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/299,170

(22) Filed: Mar. 12, 2019

(65) Prior Publication Data

US 2020/0294467 A1 Sep. 17, 2020

(51) Int. Cl.
*G09G 5/10* (2006.01)
*G01N 21/47* (2006.01)
*G09G 3/36* (2006.01)

(52) U.S. Cl.
CPC ........... *G09G 5/10* (2013.01); *G01N 21/4788* (2013.01); *G09G 3/36* (2013.01); *G01N 2021/4735* (2013.01); *G01N 2201/0635* (2013.01); *G01N 2201/0638* (2013.01); *G09G 2320/041* (2013.01); *G09G 2320/0673* (2013.01); *G09G 2320/0693* (2013.01); *G09G 2360/14* (2013.01)

(58) Field of Classification Search
CPC .... G09G 5/10; G09G 3/36; G09G 2320/0693; G09G 2360/14; G09G 2320/0673; G09G 2320/041; G01N 21/4788; G01N 2201/0638; G01N 2021/4735; G01N 2201/0635
See application file for complete search history.

(56) References Cited

U.S. PATENT DOCUMENTS

| | | | | |
|---|---|---|---|---|
| 7,505,155 B2* | 3/2009 | Jang | ....................... | G01N 21/95 356/634 |
| 8,357,620 B2* | 1/2013 | Takagi | .................... | B23K 26/03 438/799 |
| 9,857,314 B1* | 1/2018 | Yang | .................... | G01N 21/958 |

(Continued)

FOREIGN PATENT DOCUMENTS

| CN | 105788453 | 7/2016 |
|---|---|---|
| CN | 107369404 | 11/2017 |

OTHER PUBLICATIONS

"Office Action of Taiwan Counterpart Application", dated Mar. 24, 2020, p. 1-p. 6.

*Primary Examiner* — Vinh T Lam
(74) *Attorney, Agent, or Firm* — JCIPRNET

(57) ABSTRACT

A display apparatus having a display panel, a humidity DETECTION method thereof and a GAMMA curve calibration method are provided. A humidity detection method and a gamma curve calibration method for the display panel of the display apparatus are also provided. The humidity detection method for the display panel includes: displaying a test pattern via the display panel; projecting an incident light to the test pattern of the display panel via a light source to generate a diffraction light; and detecting the diffraction light via a light detector to obtain a humidity information of the display panel. Therefore, a gamma setting of the display panel may be adjusted via the humidity information of the display panel.

39 Claims, 3 Drawing Sheets

(56) References Cited

U.S. PATENT DOCUMENTS

| | | | |
|---|---|---|---|
| 2003/0017658 A1* | 1/2003 | Nishitani | H01L 21/2026 |
| | | | 438/149 |
| 2005/0189329 A1* | 9/2005 | Talwar | B23K 26/067 |
| | | | 219/121.65 |
| 2010/0188324 A1* | 7/2010 | Ohashi | G09G 3/3426 |
| | | | 345/102 |
| 2010/0214505 A1* | 8/2010 | Kim | G02F 1/133308 |
| | | | 349/58 |
| 2015/0247808 A1* | 9/2015 | Van Der Wilt | H01L 22/12 |
| | | | 356/237.5 |
| 2016/0003749 A1* | 1/2016 | Sun | G01N 33/521 |
| | | | 422/82.05 |
| 2016/0252452 A1* | 9/2016 | Thun | G01N 15/1459 |
| | | | 356/51 |
| 2019/0005908 A1 | 1/2019 | Chen | |
| 2019/0049393 A1* | 2/2019 | Roobol | G03F 7/70575 |
| 2019/0064677 A1* | 2/2019 | Jak | G03F 9/7076 |

\* cited by examiner

DISPLAY APPARATUS HAVING DISPLAY PANEL AND HUMIDITY DETECTION METHOD THEREOF AND GAMMA CURVE CALIBRATION METHOD THEREOF

BACKGROUND OF THE INVENTION

Field of the Invention

The invention is related to a humidity detection method, and more particularly, to a humidity detection method and a gamma curve calibration method of a display panel.

Description of Related Art

With the advancement of display techniques, since liquid crystal on silicon (LCoS) panel has high-resolution display capability, LCoS panel has gradually become the mainstream trend in the design of automotive head-up display. LCoS panel may modulate the phase of the incident light via simple voltage control to generate a stereoscopic image. The stereoscopic image may be used as a display image of a vehicle dashboard. (However, the phase modulation curve of LCoS panel (that is, the characteristic curve of voltage-versus-phase) is easily affected by environmental conditions such as temperature and humidity and shifted as a result. In particular, when LCoS panel operates at a higher temperature or humidity, the display screen of LCoS panel generates image noise due to the shift of the phase modulation curve, resulting in poor display quality.

SUMMARY OF THE INVENTION

The invention provides a display apparatus having a display panel and a humidity detection method and a gamma curve calibration method thereof. The display apparatus may calibrate the gamma curve of the display panel according to the humidity information of the display panel.

An embodiment of the invention provides a humidity detection method of a display panel. The humidity detection method includes the following steps. A test pattern is displayed via the display panel. An incident light is projected to the test pattern of the display panel via a light source to generate a diffraction light. The diffraction light is detected via a light detector to obtain a humidity information of the display panel.

Another embodiment of the invention provides a display apparatus. The display apparatus includes a light source, a display panel, a light detector, and a controller. The light source is used to provide an incident light. The display panel is used to display a test pattern. The incident light is projected onto the test pattern of the display panel to generate a diffraction light. The light detector is used to detect the diffraction light to generate a detection result. The controller is coupled to the display panel and the light detector and obtains a humidity information of the display panel according to the detection result of the light detector.

Yet another embodiment of the invention provides a gamma curve calibration method. The gamma curve calibration method includes the following steps. A humidity information of a display panel is determined. A temperature of the display panel is sensed via a temperature sensor to obtain a temperature information. A gamma setting of the display panel is determined according to the humidity information and the temperature information.

Another embodiment of the invention provides a display apparatus. The display apparatus includes a display panel, a temperature sensor, and a controller. The temperature sensor is used to sense a temperature of the display panel to obtain a temperature information. The controller is coupled to the display panel and the temperature sensor and determines a humidity information of the display panel. The controller determines a gamma setting of the display panel according to the humidity information and the temperature information.

Based on the above, in an embodiment of the invention, the display apparatus may obtain the humidity information of the display panel by detecting the diffraction light generated by the display panel. The display apparatus may also obtain the temperature information of the display panel via a temperature sensor. Therefore, the display apparatus of the embodiments of the invention may instantly adjust the gamma setting of the display panel according to the humidity information and the temperature information. Since the gamma setting of the display panel may be instantly adjusted as the operating conditions (temperature, humidity) of the display panel are changed, the display screen of the display panel may maintain good image quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
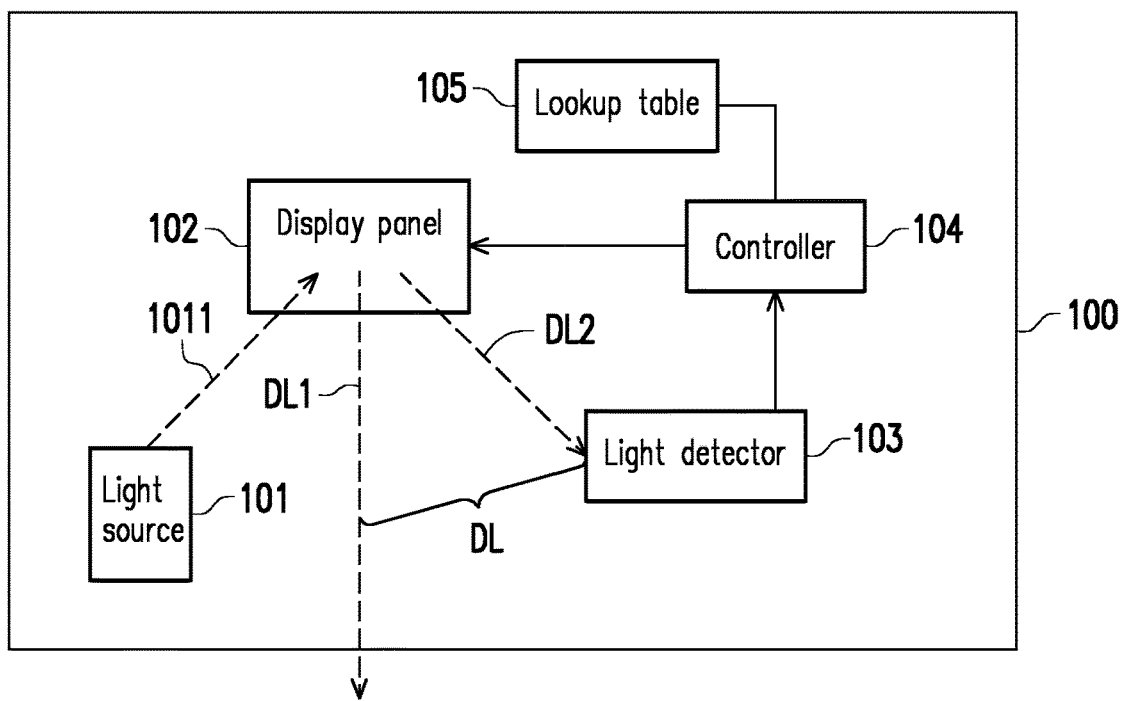
FIG. 1A is a circuit block diagram of a display apparatus according to an embodiment of the invention.

The term "coupled to (or connected to)" used in the entire text of the specification of the present application (including claims) may refer to any direct or indirect connecting means. For instance, if the text describes a first device is coupled to (or connected to) a second device, then it should be understood that the first device may be directly connected to the second device, or the first device may be indirectly connected to the second device via other devices or certain connecting means. Moreover, when applicable, devices/components/steps having the same reference numerals in figures and embodiments represent the same or similar parts. Elements/components/steps having the same reference numerals or having the same terminology in different embodiments may be cross-referenced.

FIG. 1A is a circuit block diagram of a display apparatus according to an embodiment of the invention. As shown in FIG. 1A, a display apparatus 100 includes a light source 101, a display panel 102, a light detector 103, and a controller 104. The display panel 102 has a plurality of pixels (not shown). The display apparatus 100 may drive pixels at different positions on the display panel 102 according to design requirements, so that the display panel 102 may display a specific test pattern (not shown). The test pattern may be a pixel pattern that causes a diffraction phenomenon to light waves, such as a grating pattern.

Figure 1B:
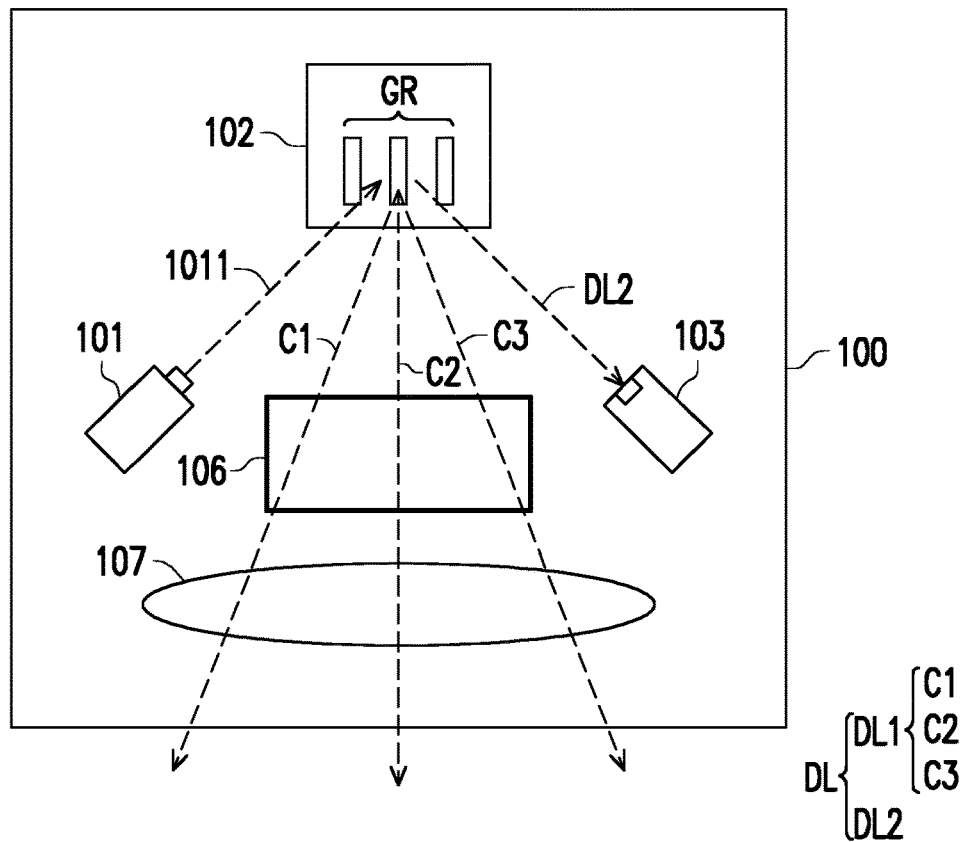
FIG. 1B is a schematic of an optical path configuration of the display apparatus of FIG. 1A according to an embodiment of the invention.

The light source 101 may provide an incident light 101I and project the incident light 101I to a test pattern (not shown) displayed via the display panel 102 to generate a diffraction light DL. The light detector 103 may generate a detection result by detecting the diffraction light DL. For example, FIG. 1B is a schematic of an optical path configuration of the display apparatus 100 of FIG. 1A according to an embodiment of the invention. In the embodiment of FIG. 1B, the display panel 102 may display the grating pattern GR as a test pattern. According to design requirements, the display panel 102 of FIG. 1B may be a liquid crystal on silicon (LCoS) panel or other liquid crystal panels, and the light source 101 of FIG. 1B may be a light projector for projecting a laser beam.

When the light source 101 projects the incident light 101I to the grating pattern GR of the display panel 102, the display panel 102 generates a diffraction light DL. As shown in FIG. 1B, the diffraction light DL includes a first diffraction light component DL1 and a second diffraction light component DL2, and the diffraction order of the second diffraction light component DL2 is higher than the diffraction order of the first diffraction light component DL1. In the embodiment of FIG. 1B, the first diffraction light component DL1 and the second diffraction light component DL2 detected by the light detector 103 exhibit a higher correlation. For example, the diffraction order of the first diffraction light component DL1 includes at least one of 0, 1, and −1, and the diffraction order of the second diffraction light component DL2 includes 3. That is, the first diffraction light component DL1 may include at least one of a −1-order diffraction light C1, a 0-order diffraction light C2, and a +1-order diffraction C3, and the second diffraction light component DL2 may include a 3-order diffraction light.

As shown in FIG. 1B, an aperture 106 and a lens 107 are further disposed inside the display apparatus 100. The aperture 106 is disposed between the display panel 102 and the lens 107. The aperture 106 may block the second diffraction light component DL2 and collect the first diffraction light component DL1 as a signal light forming a virtual display image. The lens 107 allows the first diffraction light component DL1 to be imaged to the outside of the display apparatus 100 and enhances the imaging field of view. The second diffraction light component DL2 may be received by the light detector 103 for light intensity detection.

Referring to FIG. 1A again, the controller 104 is coupled to the light detector 103 to obtain the humidity information of the display panel 102 according to the detection result of the light detector 103. For example, the display apparatus 100 may be provided with a lookup table 105. The lookup table 105 may be built with humidity reference information such as a corresponding data between the light intensity of the second diffraction light component DL2 and the humidity value of the display panel 102. The controller 103 may learn the light intensity of the second diffraction light component DL2 in the diffraction light DL by receiving the detection result of the light detector 103 and find the corresponding humidity value from the lookup table 105 as the humidity information of the display panel 102. In this way, the controller 103 may adjust the gamma setting of the display panel according to the humidity information of the display panel 102 to prevent the moisture inside the display panel 102 from affecting the image quality of the display screen.

It should be noted that, in the above embodiments, the first diffraction light component DL1 is used as a signal light forming a virtual display image, and the second diffraction light component DL2 detected by the light detector 103 is used as a calibration light adjusting the gamma setting of the display panel, and therefore the higher the correlation between the first diffraction light component DL1 and the second diffraction light component DL2, the more accurately the gamma curve of the display panel may be calibrated. Since the correlation between the 3-order diffraction light and the first diffraction light component DL1 in the diffraction light DL is higher, in the embodiment of FIG. 1B, the 3-order diffraction light in the diffraction light DL is selected as the second diffraction light component DL2.

Figure 2:
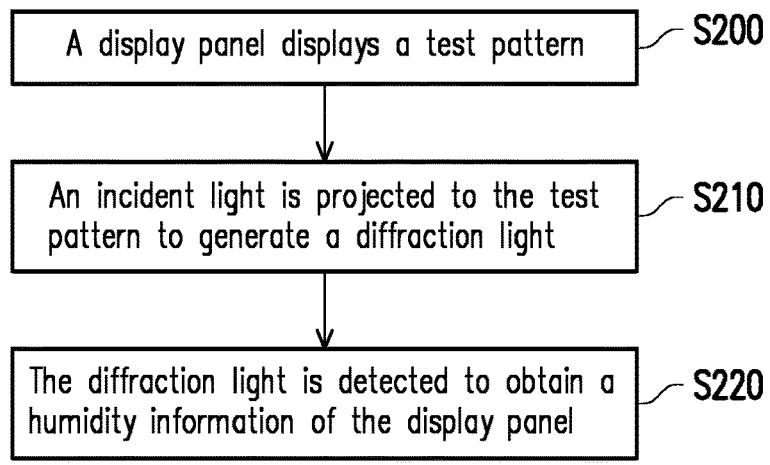
FIG. 2 is a flowchart of a humidity detection method of a display panel according to an embodiment of the invention.

FIG. 2 is a flowchart of a humidity detection method of a display panel according to an embodiment of the invention. Referring to FIG. 1 and FIG. 2, in step S200, the display panel 102 may display a test pattern. In step S210, the light source 101 may project the incident light 101I to the test pattern of the display panel 102 to generate the diffraction light DL. When the diffraction light DL is generated, the light detector 103 may detect the diffraction light DL in step S220 and provide the light intensity information of the diffraction light DL to the controller 104, so that the controller 104 obtains the humidity information of the display panel 102 according to the light intensity information of the diffraction light DL and the humidity reference information in the lookup table 105. The implementation details of step S200, step S210, and step S220 may be analogized with reference to the related description of the embodiment shown in FIG. 1A and FIG. 1B, and therefore are not described again.

In some other embodiments, the controller 104 of FIG. 1A may also adjust at least one driving voltage of the display panel 102 and learn the light intensity of the second diffraction light component DL2 in the diffraction light DL via the detection result provided by the light detector 103 to further obtain a voltage-versus-phase characteristic curve. In other words, during the adjustment period of the driving voltage, the controller 104 may obtain a voltage-versus-phase characteristic curve according to the light intensity variation caused by different driving voltages. Based on the voltage-versus-phase characteristic curve, the controller 104 may find the corresponding humidity value from the lookup table 105 as the humidity information of the display panel 102.

In detail, the controller 104 may adjust at least one driving voltage of the display panel 102 to detect a plurality of light intensities of the second diffraction light component DL2 during the adjustment period of the driving voltage. The controller may respectively calculate a plurality of phase values corresponding to the light intensities according to the light intensities (for example, calculating a phase value via a built-in conventional algorithm) and generate a voltage-versus-phase characteristic curve according to the phase values. After the controller 104 generates a voltage-versus-phase characteristic curve by adjusting the driving voltage of the display panel 102, the controller 104 may compare the voltage-versus-phase characteristic curve with the humidity reference information built into the lookup table 105 to find the humidity value corresponding to the voltage-versus-phase characteristic curve from the lookup table 105 to determine the humidity state of the display panel 102.

Figure 3:
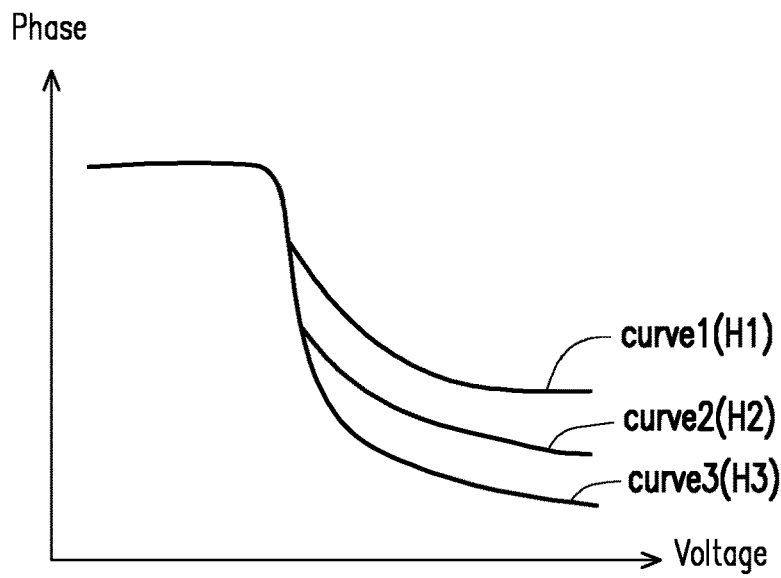
FIG. 3 is a schematic of a humidity reference information built into the lookup table of FIG. 1A according to an embodiment of the invention.

For example, the lookup table 105 of FIG. 1A may be pre-built with a plurality of voltage-versus-phase reference curves under different humidity conditions as the humidity reference information of the lookup table 105. FIG. 3 is a schematic of a humidity reference information built into the lookup table 105 of FIG. 1A according to an embodiment of the invention. The vertical axis shown in FIG. 3 represents phase, and the horizontal axis represents voltage. In the embodiment of FIG. 3, the humidity reference information of the lookup table 105 includes a first reference curve curve 1, a second reference curve curve 2, and a third reference curve curve 3. The first reference curve curve 1 corresponds to a humidity value H1, the second reference curve curve 2 corresponds to a humidity value H2, and the third reference curve curve 3 corresponds to a humidity value H3. The humidity values H1, H2, and H3 respectively represent different humidity states.

The controller 104 may apply a larger driving voltage to certain pixels or all of the pixels of the display panel 102 to change the light intensity of the second diffraction light component DL2. The controller 104 may also apply a smaller driving voltage to certain pixels or all of the pixels of the display panel 102 to change the light intensity of the second diffraction light component DL2. After the controller 104 generates a voltage-versus-phase characteristic curve by adjusting the driving voltage of the display panel 102, the controller 104 may compare the voltage-versus-phase characteristic curve with reference curves in the lookup table 105 (i.e., the first reference curve curve 1, the second reference curve curve 2, and the third reference curve curve 3) one by one. If the voltage-versus-phase characteristic curve is highly correlated with the first reference curve curve 1, then the controller 104 may determine that the display panel 102 has the humidity value H1. Similarly, if the voltage-versus-phase characteristic curve is highly correlated with the second reference curve curve 2, then the controller 104 may determine that the display panel 102 has the humidity value H2.

Figure 4:
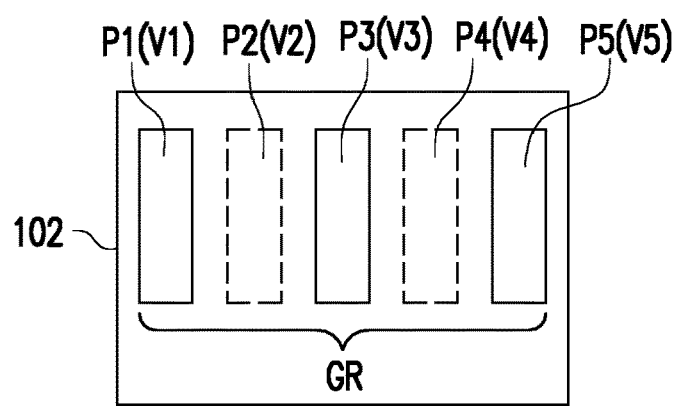
FIG. 4 is a schematic of the generation of a test pattern via the display panel of FIG. 1A according to an embodiment of the invention.

FIG. 4 is a schematic of the generation of a test pattern via the display panel 102 of FIG. 1A according to an embodiment of the invention. As shown in FIG. 4, the display panel 102 may display the grating pattern GR as a test pattern. The grating pattern GR includes a first column of pixels P1, a second column of pixels P2, a third column of pixels P3, a fourth column of pixels P4, and a fifth column of pixels P5 adjacent to one another. Adjacent columns of pixels in the grating pattern GR may be driven by different driving voltages (i.e., V1, V2, V3, V4, V5). For example, the first driving voltage V1 of the first column of pixels P1 may be different from the second driving voltage V2 of the second column of pixels P2, and the second driving voltage V2 of the second column of pixels P2 may be different from the third driving voltage V3 of the third column of pixels P3, and so on. In the embodiment of FIG. 4, the first driving voltage V1 of the first column of pixels P1, the third driving voltage V3 of the third column of pixels P3, and the fifth driving voltage V5 of the fifth column of pixels P5 may be greater than the second driving voltage V2 of the second column of pixels P2 and the fourth driving voltage V4 of the fourth column of pixels P4 (i.e., V1, V3, V5 are all greater than V2, V4). Therefore, the display panel 102 may display a "bright/dark/bright/dark/bright" grating pattern GR.

Referring to FIG. 1 and FIG. 4, it is assumed that the first driving voltage V1 is greater than the second driving voltage V2. The controller 104 may adjust the voltage difference between the first driving voltage V1 and the second driving voltage V2 to learn to learn a plurality of light intensities of the second diffraction light component DL2 of the diffraction light DL during an adjustment period of the driving voltage via the detection result provided by the light detector 103. For example, the controller 104 may not adjust the first driving voltage V1 and increase the second driving voltage V2 such that the voltage difference between the first driving voltage V1 and the second driving voltage V2 is gradually decreased. The controller 104 may also not adjust the second driving voltage V2 and decrease the first driving voltage V1 such that the voltage difference between the first driving voltage V1 and the second driving voltage V2 is gradually decreased.

Since the voltage difference between the first driving voltage V1 and the second driving voltage V2 is changed, the brightness of the grating pattern GR is also changed, thereby changing the light intensity of the second diffraction light component DL2. In other words, each time the voltage difference between the first driving voltage V1 and the second driving voltage V2 is changed, a corresponding light intensity of the second diffraction light component DL2 is generated. Therefore, during the adjustment period of the voltage difference between the first driving voltage V1 and the second driving voltage V2, the light detector 103 may detect the plurality of light intensities of the second diffraction light component DL2.

The controller 104 may respectively calculate a plurality of phase values corresponding to the light intensities according to the plurality of light intensities detected by the light detector 103 (e.g., calculating the phase values via a built-in conventional algorithm). The controller 104 may again generate a voltage-versus-phase characteristic curve according to these phase values.

For example, when the lookup table 105 is built with a voltage-versus-phase reference curve as shown in FIG. 3, the controller 104 may compare the voltage-versus-phase characteristic curve with reference curves in the lookup table 105 (i.e., the first reference curve curve 1, the second reference curve 2, and the third reference curve 3) on by one. If the voltage-versus-phase characteristic curve is highly correlated with the first reference curve curve 1, then the controller 104 may determine that the display panel 102 has the humidity value H1. Similarly, if the voltage-versus-phase characteristic curve is highly correlated with the second reference curve curve 2, then the controller 104 may determine that the display panel 102 has the humidity value H2.

Figure 5A:
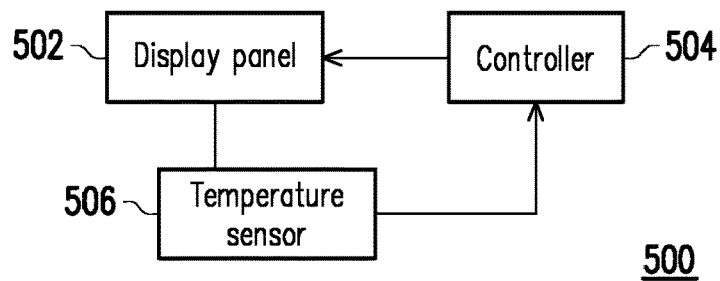
FIG. 5A is a circuit block diagram of a display apparatus according to another embodiment of the invention.

FIG. 5A is a circuit block diagram of a display apparatus according to another embodiment of the invention. As shown in FIG. 5A, a display apparatus 500 includes a display panel 502, a controller 504, and a temperature sensor 506. The display panel 502 has a plurality of pixels (not shown). The display apparatus 500 may drive pixels at different positions on the display panel 502 according to design requirements, so that the display panel 502 may display a specific test pattern. The temperature sensor 506 may be disposed on the surface of or inside the display panel 502 to sense the temperature of the display panel 502. The controller 504 is coupled to the display panel 502 and the temperature sensor 506. The controller 504 may determine the humidity information of the display panel 502. How the controller 504 determines the humidity information of the display panel 502 is described below with reference to FIG. 5B.

Figure 5B:
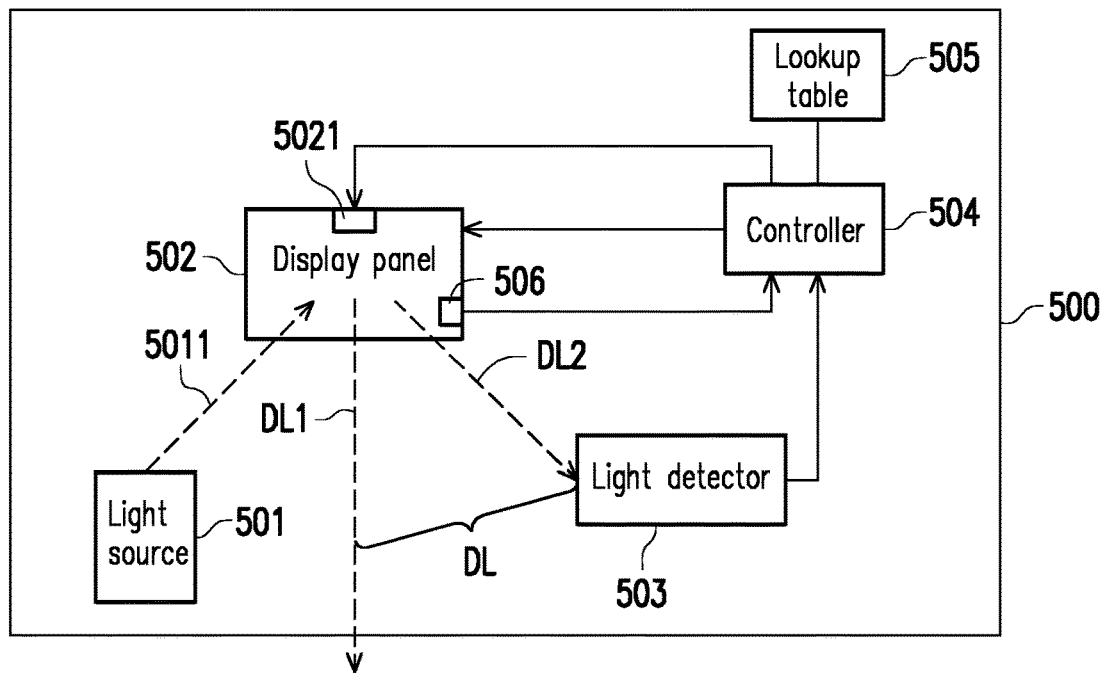
FIG. 5B is a circuit block diagram of the display apparatus of FIG. 5A according to an embodiment of the invention.

FIG. 5B is a circuit block diagram of the display apparatus 500 of FIG. 5A according to an embodiment of the invention. As shown in FIG. 5B, the display apparatus 500 further includes a light source 501, a light detector 503, and a lookup table 505. The light source 501 may provide an incident light 5011 to the display panel 502. The display panel 502 may display a test pattern (not shown). The test pattern is, for example, a grating pattern that may cause a diffraction phenomenon to light waves. When the light source 501 projects the incident light 5011 to the test pattern (not shown) of the display panel 502, the display panel 502 generates a diffraction light DL. The diffraction light DL includes a first diffraction light component DL1 and a second diffraction light component DL2, and the diffraction order of the second diffraction light component DL2 is higher than the diffraction order of the first diffraction light component DL1.

The light detector 503 may detect the second diffraction light component DL2 of the diffraction light DL and provide the detection result to the controller 504. The controller 504 may obtain the humidity information of the display panel 502 according to the detection result. For example, the controller 504 may directly find the corresponding humidity value from the lookup table 505 as the humidity information of the display panel 502 according to the light intensity of the second diffraction light component DL2. The controller 504 may also obtain a voltage-versus-phase characteristic curve related to the second diffraction light component DL2 by adjusting the driving voltage of the display panel 502. Based on the voltage-versus-phase characteristic curve, the controller 504 may find the corresponding humidity value from the lookup table 505 as the humidity information of the display panel 502. The implementation details of the controller 504 obtaining the humidity information of the display panel 502 via the lookup table 505 may be analogized with reference to the related descriptions of FIG. 1A, FIG. 1B, and FIG. 3, and therefore is not described again.

Referring again to FIG. 5B, the display panel 502 further includes a gamma buffer 5021. The gamma buffer 5021 may store the gamma setting of the display panel 502. For example, the gamma buffer 5021 may store the original gamma parameters of the display panel 502 for later calibration use. In the embodiment of FIG. 5B, the temperature sensor 506 is disposed inside the display panel 502 to obtain the temperature information of the display panel 502. The controller 504 may determine the gamma setting for the display panel 502 according to the humidity information of the display panel 502 and the temperature information of the display panel 502.

In some embodiments, the controller 504 may receive the temperature information provided by the temperature sensor 506 to adjust the gamma setting of the display panel 502 according to the temperature information of the display panel 502. In some other embodiments, the controller 504 may also receive the detection result provided by the light detector 503 and find the humidity value corresponding to the detection result via the lookup table 505, thereby obtaining the humidity information of the display panel 502, and then adjust the gamma setting of the display panel 502 according to the humidity information of the display panel 502. In addition, the controller 504 may also adjust the gamma setting of the display panel 502 according to the humidity information of the display panel 502 and the temperature information of the display panel 502 at the same time.

For example, the lookup table 505 of FIG. 5B may be built with gamma information as shown in Table 1 below. T1, T2, and T3 shown in Table 1 respectively represent different temperature values. H1, H2, and H3 shown in Table 1 respectively represent different humidity values. G11, G12, G13, G21, G22, G23, G31, G32, and G33 shown in Table 1 respectively represent gamma parameters of the display panel 502 operating at a specific temperature and a specific humidity. For example, when the display panel 502 is operated at the humidity value H1 and the temperature value T1, the display panel 502 has the gamma parameter G11. When the display panel 502 is operated at the humidity value H1 and the temperature value T1, the display panel 502 has the gamma parameter G12, and so on.

TABLE 1

|  | Temperature | | |
| --- | --- | --- | --- |
| Humidity | T1 | T2 | T3 |
| H1 | G11 | G12 | G13 |
| H2 | G21 | G22 | G23 |
| H3 | G31 | G32 | G33 |

Referring to FIG. 5B again, it is assumed that the controller 504 determines that the display panel 502 has the humidity value H1 according to the detection result of the light detector 503, and the controller 504 learns the display panel 502 has the temperature value of T2 according to the sensing result of the temperature sensor 506. Based on the humidity value H1 and the temperature value T2, the controller 504 may determine via the lookup table 505 (as shown in Table 1) that the display panel 502 has the gamma parameter G12.

Since the gamma buffer 5021 stores the original gamma parameters of the display panel 502, the controller 504 may obtain the original gamma parameters of the display panel 502 via the gamma buffer 5021. The controller 504 may adjust the gamma parameter G12 according to the original gamma parameter to calibrate the gamma curve of the display panel 502 at the humidity value H1 and the temperature value T2 to the original gamma curve. Via the above calibration manner, the controller 504 may instantly adjust the gamma setting of the display panel according to the humidity information and the temperature information of the display panel 502. Therefore, the display panel 502 may maintain good display quality without being affected by operating conditions (temperature, humidity).

Figure 6:
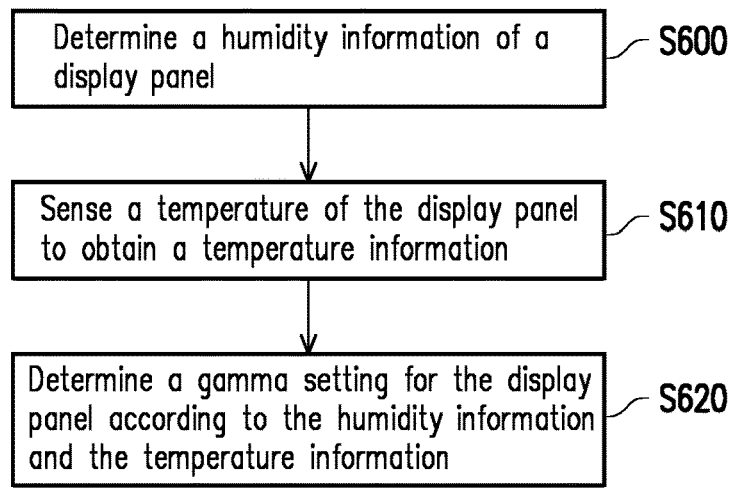
FIG. 6 is a flowchart of a gamma curve calibration method according to an embodiment of the invention.

FIG. 6 is a flowchart of a gamma curve calibration method according to an embodiment of the invention. Referring to FIG. 5A and FIG. 6, in step S600, the controller 504 may determine the humidity information of the display panel 502. In step S610, the temperature sensor 506 may sense the temperature of the display panel 502 to obtain temperature information. After the controller 504 receives the temperature information provided by the temperature sensor 506, the controller 504 may determine the gamma setting for the display panel 502 according to the humidity information and the temperature information in step S620. The implementation details of step S600, step S610, and step S620 may be analogized with reference to the related description of the embodiment shown in FIG. 5A and FIG. 5B, and therefore are not described again.

Based on the above, in an embodiment of the invention, the display apparatus may obtain the humidity information of the display panel by detecting the diffraction light generated by the display panel. The display apparatus may also obtain the temperature information of the display panel via a temperature sensor. Therefore, the display apparatus of the embodiments of the invention may instantly adjust the gamma setting of the display panel according to the humidity information and the temperature information. Since the gamma setting of the display panel may be instantly adjusted as the operating conditions (temperature, humidity) of the display panel are changed, the display screen of the display panel may maintain good image quality.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A humidity detection method of a display panel, comprising:
    displaying a test pattern via the display panel;
    projecting an incident light to the test pattern of the display panel via a light source to generate a diffraction light; and
    detecting the diffraction light via a light detector to obtain a humidity information of the display panel, wherein the step of detecting the diffraction light comprises:
        adjusting at least one driving voltage of the display panel and detecting a light intensity of the diffraction light to obtain a voltage-versus-phase characteristic curve; and
        finding a corresponding humidity value from a lookup table as the humidity information of the display panel according to the voltage-versus-phase characteristic curve.

2. The humidity detection method of claim 1, wherein the step of detecting the diffraction light comprises:
    detecting a light intensity of the diffraction light; and
    finding a corresponding humidity value from a lookup table as the humidity information of the display panel according to the light intensity of the diffraction light.

3. The humidity detection method of claim 1, wherein the step of obtaining the voltage-versus-phase characteristic curve comprises:
    adjusting the at least one driving voltage of the display panel to detect a plurality of light intensities of the diffraction light during a driving voltage adjustment period;
    respectively calculating a plurality of phase values corresponding to the light intensities according to the light intensities; and
    generating the voltage-versus-phase characteristic curve according to the phase values.

4. The humidity detection method of claim 1, wherein the display panel comprises a liquid-crystal on silicon panel.

5. The humidity detection method of claim 1, wherein the diffraction light comprises a first diffraction light component and a second diffraction light component, a diffraction order of the second diffraction light component is higher than a diffraction order of the first diffraction light component, the first diffraction light component is used to image to an outside of a display apparatus having the display panel, and the second diffraction light component is provided to the light detector to detect a light intensity.

6. The humidity detection method of claim 5, wherein the diffraction order of the first diffraction light component includes at least one of 0, 1, and −1, and the diffraction order of the second diffraction light component includes 3.

7. The humidity detection method of claim 1, wherein the test pattern comprises a grating pattern.

8. The humidity detection method of claim 7, wherein the grating pattern comprises a first column of pixels and a second column of pixels adjacent to each other, and a first driving voltage of the first column of pixels is different from a second driving voltage of the second column of pixels, wherein the step of detecting the diffraction light comprises:
    adjusting a voltage difference between the first driving voltage and the second driving voltage to detect a plurality of light intensities of the diffraction light during a driving voltage adjustment period;
    respectively calculating a plurality of phase values corresponding to the light intensities according to the light intensities;
    generating a voltage-versus-phase characteristic curve according to the phase values; and
    finding a corresponding humidity value from a lookup table as the humidity information of the display panel according to the voltage-versus-phase characteristic curve.

9. A display apparatus, comprising:
    a light source for providing an incident light;
    a display panel for displaying a test pattern, wherein the incident light is projected to the test pattern of the display panel to generate a diffraction light;
    a light detector for detecting the diffraction light to generate a detection result; and
    a controller, coupled to the display panel and the light detector, for obtaining a humidity information of the display panel according to the detection result of the light detector, wherein
    the controller adjusts at least one driving voltage of the display panel and learns a light intensity of the diffraction light according to the detection result provided by the light detector to obtain a voltage-versus-phase characteristic curve; and
    the controller finds a corresponding humidity value from a lookup table as the humidity information of the display panel according to the voltage-versus-phase characteristic curve.

10. The display apparatus of claim 9, wherein the controller receives the detection result of the light detector to learn a light intensity of the diffraction light, and the controller finds a corresponding humidity value from a lookup table as the humidity information of the display panel according to the light intensity of the diffraction light.

11. The display apparatus of claim 9, wherein
    the controller adjusts the at least one driving voltage of the display panel to learn a plurality of light intensities of the diffraction light during a driving voltage adjustment period of the at least one driving voltage via the detection result provided by the light detector;
    the controller respectively calculates a plurality of phase values corresponding to the light intensities according to the light intensities; and
    the controller generates the voltage-versus-phase characteristic curve according to the phase values.

12. The display apparatus of claim 9, wherein the display panel comprises a liquid-crystal on silicon panel.

13. The display apparatus of claim 9, wherein the diffraction light comprises a first diffraction light component and a second diffraction light component, a diffraction order of the second diffraction light component is higher than a diffraction order of the first diffraction light component, the first diffraction light component is used to image to an outside of the display apparatus, and the second diffraction light component is provided to the light detector to detect a light intensity.

14. The display apparatus of claim 13, wherein the diffraction order of the first diffraction light component includes at least one of 0, 1, and −1, and the diffraction order of the second diffraction light component includes 3.

15. The display apparatus of claim 13, further comprising:
an aperture for blocking the second diffraction light component.

16. The display apparatus of claim 15, further comprising:
a lens for enhancing an imaging field of view, wherein the aperture is disposed between the display panel and the lens.

17. The display apparatus of claim 9, wherein the test pattern comprises a grating pattern.

18. The display apparatus of claim 17, wherein
the grating pattern comprises a first column of pixels and a second column of pixels adjacent to each other, wherein a first driving voltage of the first column of pixels is different from a second driving voltage of the second column of pixels;
the controller adjusts a voltage difference between the first driving voltage and the second driving voltage to learn a plurality of light intensities of the diffraction light during a driving voltage adjustment period via the detection result provided by the light detector;
the controller respectively calculates a plurality of phase values corresponding to the light intensities according to the light intensities;
the controller generates a voltage-versus-phase characteristic curve according to the phase values; and
the controller finds a corresponding humidity value from a lookup table as the humidity information of the display panel according to the voltage-versus-phase characteristic curve.

19. A gamma curve calibration method, wherein a step of determining a humidity information of a display panel comprises:
displaying a test pattern via the display panel;
projecting an incident light to the test pattern of the display panel via a light source to generate a diffraction light; and
detecting the diffraction light via a light detector to obtain the humidity information of the display panel, wherein the step of detecting the diffraction light comprises:
adjusting at least one driving voltage of the display panel and detecting a light intensity of the diffraction light to obtain a voltage-versus-phase characteristic curve; and
finding a corresponding humidity value from a lookup table as the humidity information of the display panel according to the voltage-versus-phase characteristic curve.

20. The gamma curve calibration method of claim 19, wherein the step of detecting the diffraction light comprises:
detecting a light intensity of the diffraction light; and
finding a corresponding humidity value from a lookup table as the humidity information of the display panel according to the light intensity of the diffraction light.

21. The gamma curve calibration method of claim 19, wherein the step of obtaining the voltage-versus-phase characteristic curve comprises:
adjusting the at least one driving voltage of the display panel to detect a plurality of light intensities of the diffraction light during a driving voltage adjustment period;
respectively calculating a plurality of phase values corresponding to the light intensities according to the light intensities; and
generating the voltage-versus-phase characteristic curve according to the phase values.

22. The gamma curve calibration method of claim 19, wherein the diffraction light comprises a first diffraction light component and a second diffraction light component, a diffraction order of the second diffraction light component is higher than a diffraction order of the first diffraction light component, the first diffraction light component is used to image to an outside of a display apparatus having the display panel, and the second diffraction light component is provided to the light detector to detect a light intensity.

23. The gamma curve calibration method of claim 22, wherein the diffraction order of the first diffraction light component includes at least one of 0, 1, and −1, and the diffraction order of the second diffraction light component includes 3.

24. The gamma curve calibration method of claim 19, wherein the test pattern comprises a grating pattern.

25. The gamma curve calibration method of claim 24, wherein the grating pattern comprises a first column of pixels and a second column of pixels adjacent to each other, and a first driving voltage of the first column of pixels is different from a second driving voltage of the second column of pixels, wherein the step of detecting the diffraction light comprises:
adjusting a voltage difference between the first driving voltage and the second driving voltage to detect a plurality of light intensities of the diffraction light during a driving voltage adjustment period;
respectively calculating a plurality of phase values corresponding to the light intensities according to the light intensities;
generating a voltage-versus-phase characteristic curve according to the phase values; and
finding a corresponding humidity value from a lookup table as the humidity information of the display panel according to the voltage-versus-phase characteristic curve.

26. The gamma curve calibration method of claim 19, wherein the display panel comprises a liquid-crystal on silicon panel.

27. The gamma curve calibration method of claim 19, wherein the step of determining the gamma setting for the display panel comprises:
finding a corresponding gamma setting information from a lookup table as the gamma setting according to the humidity information and the temperature information.

28. A display apparatus, comprising:
a display panel;
a temperature sensor for sensing a temperature of the display panel to obtain a temperature information; and
a controller, coupled to the display panel and the temperature sensor, for determining a humidity information of a display panel, wherein the controller determines a gamma setting for the display panel according to the humidity information and the temperature information, wherein
the controller adjusts at least one driving voltage of the display panel and learns a light intensity of the diffraction light via the detection result provided by the light detector to obtain a voltage-versus-phase characteristic curve; and the controller finds a corresponding humidity value from a lookup table as the humidity information of the display panel according to the voltage-versus-phase characteristic curve.

29. The display apparatus of claim 28, further comprising:
a light source for providing an incident light, wherein the display panel displays a test pattern, and the incident light is projected to the test pattern of the display panel to generate a diffraction light; and
a light detector coupled to the controller for detecting the diffraction light to generate a detection result;
wherein the controller obtains the humidity information of the display panel according to the detection result of the light detector.

30. The display apparatus of claim 29, wherein the controller receives the detection result of the light detector to learn a light intensity of the diffraction light, and the controller finds a corresponding humidity value from a lookup table as the humidity information of the display panel according to the light intensity of the diffraction light.

31. The display apparatus of claim 28, wherein
the controller adjusts the at least one driving voltage of the display panel to learn a plurality of light intensities of the diffraction light during a driving voltage adjustment period via the detection result provided by the light detector;
the controller respectively calculates a plurality of phase values corresponding to the light intensities according to the light intensities; and
the controller generates the voltage-versus-phase characteristic curve according to the phase values.

32. The display apparatus of claim 29, wherein the diffraction light comprises a first diffraction light component and a second diffraction light component, a diffraction order of the second diffraction light component is higher than a diffraction order of the first diffraction light component, the first diffraction light component is used to image to an outside of a display apparatus having the display panel, and the second diffraction light component is provided to the light detector to detect a light intensity.

33. The display apparatus of claim 32, wherein the diffraction order of the first diffraction light component includes at least one of 0, 1, and −1, and the diffraction order of the second diffraction light component includes 3.

34. The display apparatus of claim 32, further comprising:
an aperture for blocking the second diffraction light component.

35. The display apparatus of claim 34, further comprising:
a lens for enhancing an imaging field of view, wherein the aperture is disposed between the display panel and the lens.

36. The display apparatus of claim 29, wherein the test pattern comprises a grating pattern.

37. The display apparatus of claim 36, wherein
the grating pattern comprises a first column of pixels and a second column of pixels adjacent to each other, wherein a first driving voltage of the first column of pixels is different from a second driving voltage of the second column of pixels;
the controller adjusts a voltage difference between the first driving voltage and the second driving voltage to learn a plurality of light intensities of the diffraction light during a driving voltage adjustment period via the detection result provided by the light detector;
the controller respectively calculates a plurality of phase values corresponding to the light intensities according to the light intensities;
the controller generates a voltage-versus-phase characteristic curve according to the phase values; and
the controller finds a corresponding humidity value from a lookup table as the humidity information of the display panel according to the voltage-versus-phase characteristic curve.

38. The display apparatus of claim 28, wherein the display panel comprises a liquid-crystal on silicon panel.

39. The display apparatus of claim 28, wherein the controller finds a corresponding gamma setting information from a lookup table as the gamma setting according to the humidity information and the temperature information.

* * * * *